INVENTOR
RUDOLF BECKER

United States Patent Office 3,490,246
Patented Jan. 20, 1970

3,490,246
SPLIT PRESSURE LOW TEMPERATURE PROCESS FOR THE PRODUCTION OF GASES OF MODERATE PURITY
Rudolf Becker, Munich, Germany, assignor to Linde Aktiengesellschaft, Wiesbaden, Germany
Filed Aug. 18, 1966, Ser. No. 573,334
Claims priority, application Germany, Aug. 20, 1965,
L 51,439
Int. Cl. F25j 5/00, 3/04
U.S. Cl. 62—13                               20 Claims

ABSTRACT OF THE DISCLOSURE

A process and apparatus are provided for low temperature rectification of gaseous mixtures. The gas mixture to be separated is compressed in two partial streams to different pressures. The high pressure stream, constituting between 40 and 60% of the total air-to-be separated, is fed into a rectification column, and mixed with the low pressure partial stream, introduced into the column at approximately the midpoint thereof.

---

The invention relates to a low temperature process for the separation of gaseous mixtures wherein less than high purity is a satisfactory requirement for at least one of the separated gases, and in particular to a process for producing moderately pure oxygen from air by low temperature rectification.

In a known process for producing moderately pure oxygen from air, a simple rectification column is used; in the heating coil at the bottom of this column, the air to be separated, elevated to a higher pressure and cooled in preceding process steps, is condensed in indirect heat exchange with evaporating sump liquid, is lowered in pressure by throttling in subsequent process steps, and introduced as reflux liquid at the head of the rectification column. This conventional process has the advantage that the equipment for conducting this process is relatively simple and inexpensive. However, this process has the decided disadvantage that the gaseous nitrogen withdrawn from the head of the rectification column has a high oxygen content and is not recovered. This oxygen loss means that more refrigeration is required per unit of separated oxygen. Consequently the resultant increased direct operating costs offset the savings realized by the less expensive equipment.

When producing moderately pure oxygen by the process, it also proved to be desirable to inject a relatively large quantity of gaseous air into the rectification column at about the midpoint thereof, thereby permitting the reflux ratio to be varied along the length of the rectification column in such a manner that the argon present in the air passes out of the rectification column together with the oxygen as, so to speak, the only impurity of the oxygen. (The boiling points or argon and oxygen are very close.)

In another known process for producing moderately pure oxygen from air by low temperature rectification, a double rectification column is employed. Into the bottom of the high pressure section of this column there is introduced a partial stream of cooled high pressure air; whereas a further partial stream of cooled high pressure air is reheated and then engine expanded (expansion with the production of external work, e.g., passage through a turbine). The resultant cooled engine expanded air is then introduced into the rectification column at about the central part of the low pressure section thereof. This process has the advantage that it is not necessary for the entire amount of the air to be processed to pass through the high pressure section of the double rectification column, which in turn means that a smaller, less expensive high pressure section can be utilized. A substantial disadvantage of this known process is, however, that under normal conditions substantially more refrigeration is produced than is necessary for the process because the entire amount of air introduced in the gaseous phase into the low pressure portion of the double rectification column is engine expanded, said amount being substantially dependent upon the required purity of the oxygen to be produced. Consequently, also in this process the operating expenses are unnecessarily high and have an adverse effect upon the overall economy of this process.

An object of this invention, therefore, is to provide a process which provides savings over prior art processes for the production of moderately pure gases.

A particular object is to provide a process by which the disadvantages of the prior art are reduced or eliminated.

A further particular object is to provide a process for the production of moderately pure oxygen, said process involving relatively low operating and investment costs, and also being safe in operation. With "moderately pure oxygen" a product of separation is meant, which contains especially a part of the chemically inert gases, such as argon.

Still further objects relate to novel apparatus for the process of this invention.

Upon further study of the specification and claims, other objects and advantages of the present invention will become apparent.

For the purposes of simplicity, this invention will now be described as it pertains to the production of moderately pure oxygen which is defined as oxygen of 75 to 95, preferably to 90% purity and which contains argon. It is to be understood, however, that the teachings of this invention are applicable to the production of other cryogenic gases, as will be evident to the physicist, chemical or mechanical engineer specializing in cryogenic technology.

For the attainment of the object of this invention, there is provided a process comprising low temperature rectification and engine expansion for making up refrigeration losses, and wherein the process is particularly distinguished by the fact that the gas mixture to be separated is subjected in two partial streams to different pressures, the higher of these pressures not exceeding about 6 to 10 atmospheres, preferably about 5 atmospheres, and that the partial stream at a lower pressure (about 1.2 to 2.5 atmospheres) is introduced into the rectification column at approximately the midpoint thereof. (All "atmospheres" are set forth as absolute atmospheres.) In general, about 40 to 85% of the total gas mixture to be separated is compressed to the high pressure, depending upon the system employed.

For a thorough understanding of the invention, reference will be made to specific preferred embodiments of the invention which, however, are not to be construed as limiting with respect to the appended claims. These embodiments are illustrated by the drawings, wherein:

Figure 1:
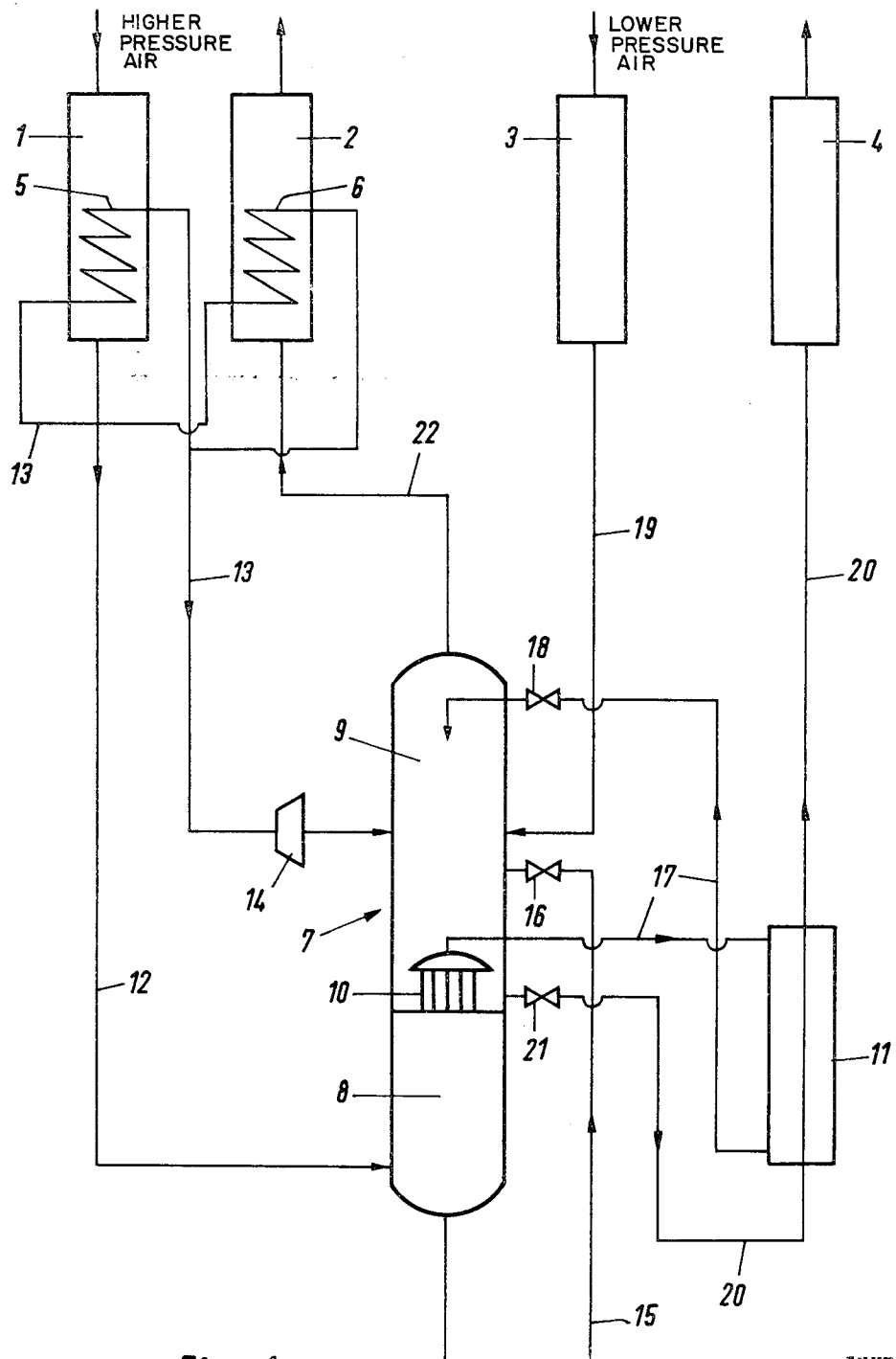
FIGURE 1 is a schematic view of a system for conducting the process of this invention, wherein a double rectification column is incorporated.

In these drawings, there is illustrated the operation of only one cycle of cyclically interchangeable regenerator groups intended for countercurrent heat exchange. For the sake of clarity, the valves and piping connections not essential for this single cycle, but indispensable for practical operation, are omitted from the drawings. However, not even considering this simplification of the drawings, attention is also invited to the fact that the use of cyclically reversible regenerators is not intended to represent a necessary requirement for conducting the process of the invention, but that the process of this invention can also be conducted with countercurrent heat exchangers of any desired type. Finally, by way of explanation, identical components in the figures are designated by identical reference numerals.

Referring to FIGURE 1, there are separated 104,000 Nm.³/h. of air, and there are produced about 20,000 Nm.³/h. of oxygen at a purity of about 90%. For cooling the air from room temperature to about liquefaction temperature, and for re-heating the separation products to ambient temperature, two groups of at least two regenerators 1 and 2, or 3 and 4, are available. Furthermore, heat exchange coils 5 and 6 are incorporated in the packing of regenerators 1 and 2 so that a partial stream of gas can be partially re-heated without absorbing the impurities deposited on the packing. The low temperature rectification of the air to be separated is conducted in a double rectification column 7, the high pressure section being designated by 8 and the low pressure section being designated by reference numeral 9. A condenser-evaporator common to both sections of the double rectification column and designated by 10 is supplemented by a counter-current heat exchanger 11 located externally of the double rectification column.

A partial stream of about 60 to 90%, preferably 75 to 85%, or for example, 84,400 Nm.³/h. of the total air to be separated is compressed to a pressure of not more than 10 atmospheres, preferably 4.4–5.0 atmospheres, or for example about 4.6 atmospheres, and cooled to about liquefaction temperature in regenerator 1. This cooled compressed partial stream is split into two fractions. The larger fraction thereof, about 60 to 80%, preferably 70 to 75%, for example, about 62,400 Nm.³/h. of air then flows via a conduit 12 to the bottom of high pressure section 8 of the double rectification column 7. The remaining smaller fraction of, for example, about 22,000 Nm.³/h. of this compressed air passes via conduit 13, successively through the heat exchange coil 5 of the regenerator 1, through expansion engine 14, and then to the double rectification column 7 at about the midsection of the low pressure section 9 thereof. Accordingly, the preliminary separation high pressure section 8 operates under a pressure of, for example, about 4.5 atmospheres, whereas the low pressure portion 9 of the double rectification column is under a small superatmospheric pressure, about 1.2–1.7, for example 1.2 atmospheres absolute. Thus, expansion engine 14 lowers the fluid pressure of the high pressure fraction from about 4.4–5.0 down to 1.2–1.7 atmospheres.

The oxygen-rich sump liquid of the high pressure section 8 is passed through conduit 15 and throttle valve 16 to the low pressure section 9 of the double rectification column at a point corresponding to the same concentration. Conduit 17 connects the head of the high pressure section 8 of the double rectification column 7 with the countercurrent heat exchanger 11 and with throttle valve 18, as well as with the head of the low pressure section 9. The vapor formed in the head of the high pressure section 8 is at least partially liquefied in the countercurrent heat exchanger 11, expanded in throttle valve 18, and passed to the low pressure section 9 of the double rectification column 7 as reflux liquid.

The smaller partial stream of, for example, about 19,600 Nm.³/h. of the air to be separated is compressed to a low superatmospheric pressure, for example about 1.5 atmospheres absolute, cooled to about liquefaction temperature in regenerator 3, and introduced into the double rectification column 7 via a conduit 19 at about the midpoint of the low pressure section 9 of this rectification column. The oxygen produced as the final product leaves the low pressure section 9 in the liquid phase via conduit 20, is evaporated in countercurrent heat exchanger 11, and then warmed to ambient temperature in the regenerator 4. A throttle valve 21 provided in the conduit 20 serves to lower the pressure of, as well as for regulating the amount of oxygen withdrawn. The nitrogen produced during the air separation is withdrawn in the gaseous phase via conduit 22 from the head of the low pressure section 9 of the double rectification column 7, and is passed to the regenerator 2. In this regenerator 2, the nitrogen is warmed and absorbs deposited impurities.

Figure 2:
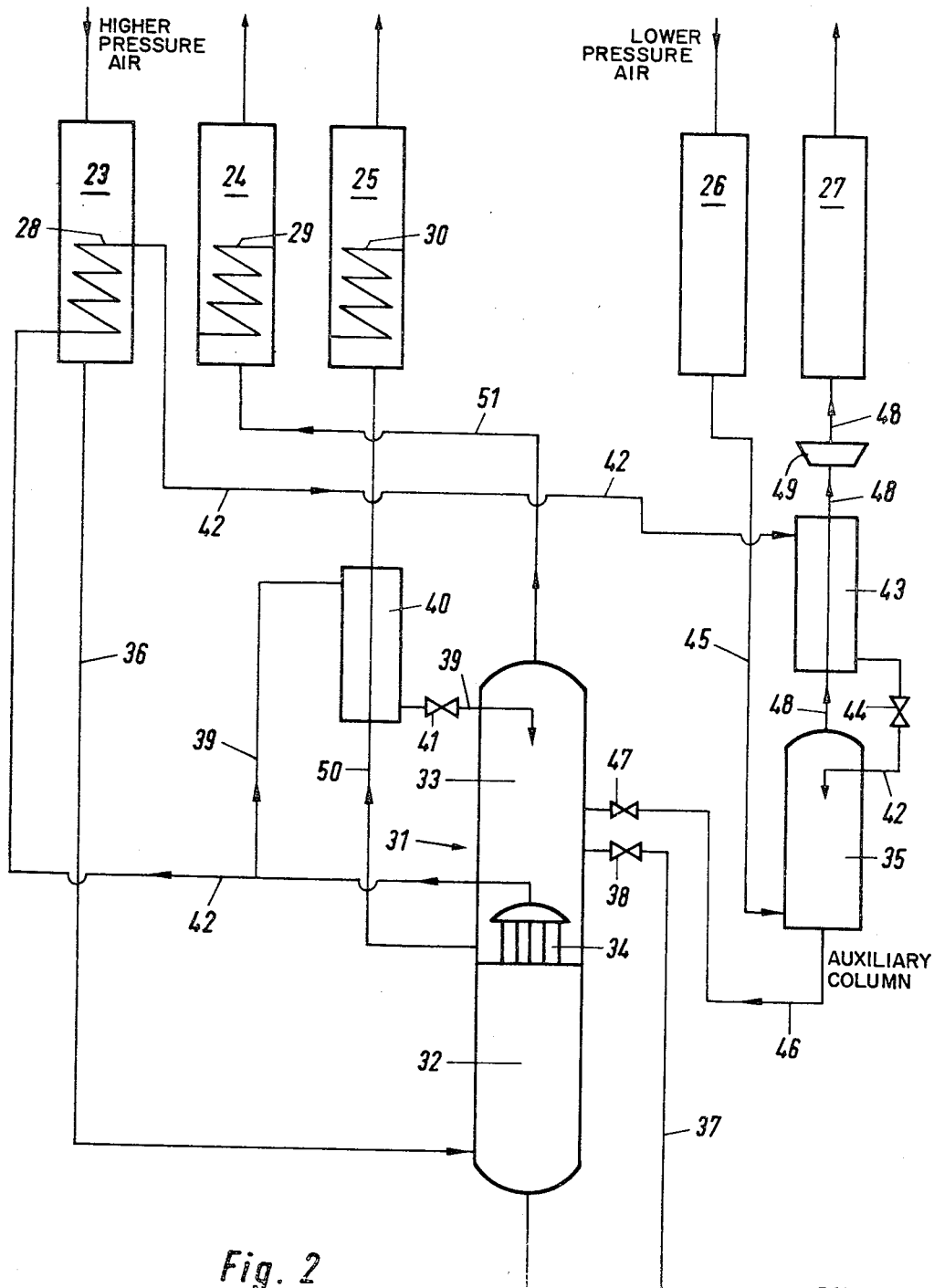
FIGURE 2 is a schematic view of a system incorporating both a double rectification column and an auxiliary rectification column.

As another embodiment, in the system illustrated in FIGURE 2 of the drawings, there can be processed, for example, 105,000 Nm.³/h. of air, and there can again be produced about 20,000 Nm.³/h. of oxygen of a purity of about 90%. For countercurrent heat exchange between the air to be separated and the separation products, a group of three cyclically interchangeable regenerators 23, 24 and 25 are available, as well as a group of two cyclically interchangeable regenerators 26 and 27. The regenerators 23, 24, and 25 are further provided with heat exchange coils 28, 29, and 30 inserted in the regenerator packing. By the utilization of these coils, a partial gas stream can be partially rewarmed without absorbing impurities.

The low temperature rectification of the air to be separated is conducted in a double rectification column 31, having high pressure section 32 operatively connected with a low pressure section 33 via a common condenser-evaporator 34. The low pressure section 33 is further provided with an auxiliary rectification column 35 wherein the entering low pressure partial stream of air to be separated is rectified prior to entering the low pressure section of the double rectification column 31.

A partial stream of about 50–60%, preferably 54–58%, for example about 60,400 Nm.³/h. of the air to be separated is compressed to a pressure of about 4.4–5.0, for example 4.6 atmospheres absolute, cooled in the regenerator 23 to about liquefaction temperature, and introduced through conduit 36, into the bottom of the high pressure section 32 of the double rectification column 31. From the high pressure section 32 a sump product enriched in oxygen is withdrawn through conduit 37, expanded in throttle valve 38 to a pressure of about 1.2–1.7, preferably 1.2 atmospheres absolute, and fed to the low pressure section 33 at a point corresponding to its concentration. A part about 40 to 55, preferably 45 to 50% of the gaseous overhead product from the high pressure section 32 passes, via conduit system 39, into a countercurrent heat exchanger 40 and from there via throttle valve 41 as reflux liquid into the top of the low pressure section 33. The countercurrent heat exchanger 40 positioned externally of column 31 serves to liquefy the overhead product from the high pressure section, and thereby supplements condenser-evaporator 34.

Another part of the overhead product from the high pressure section 32 is passed via conduit 42 through heat exchange coil 28 of the regenerator 23 and then through countercurrent heat exchanger 43. This part of the overhead stream is then introduced, after pressure reduction through throttle valve 44, as reflux liquid into the top of the auxiliary rectification column 35. In this connection, partial reheating occurs in the coil 28, and re-cooling with liquefaction takes place in the countercurrent heat exchanger 43.

Referring now to the gas-to-be-separated, another partial stream of, for example, about 44,600 Nm.³/h. of air is compressed to a pressure of about 2.0–2.5, preferably about 2.3 atmospheres absolute, cooled to about liquefaction temperature in the regenerator 26, and fed via conduit 45 into the bottom of the auxiliary rectification column 35. The sump product from the auxiliary rectification column 35, enriched in oxygen, flows via a conduit 46 to the low pressure section 33 of the double rectification column 31. Since the auxiliary rectification column 35 is under a pressure of about 2.0–2.5, preferably 2.3 atmospheres absolute when operating, while the low pressure section 33 is under a pressure of about 1.2 atmospheres absolute, the sump liquid of the auxiliary rectification column is pressure reduced in throttle valve 47.

The gaseous overhead product from the auxiliary rectification column 35 flows through a conduit 48 successively through countercurrent heat exchanger 43, expansion engine 49, and regenerator 27, this overhead product being thereby partially warmed in countercurrent heat exchanger 43, expanded in the expansion engine 49 to almost ambient pressure, and rewarmed in the regenerator 27 to about ambient temperature.

Conduit 50 connects the bottom of the low pressure section 33 of the double rectification column 31 with the countercurrent heat exchanger 40, and the latter, in turn, with regenerator 25. Liquid oxygen, as the final product, leaves the low pressure section 33 through conduit 50, is evaporated in countercurrent heat exchanger 40, and then warmed in regenerator 25 to ambient temperature. The gaseous overhead product from the low pressure section 33 flows, via conduit 51, to regenerator 24 wherein it is warmed to ambient temperature and is also employed as scavenging gas to remove the impurities deposited on the regenerator packing materials.

Figure 3:
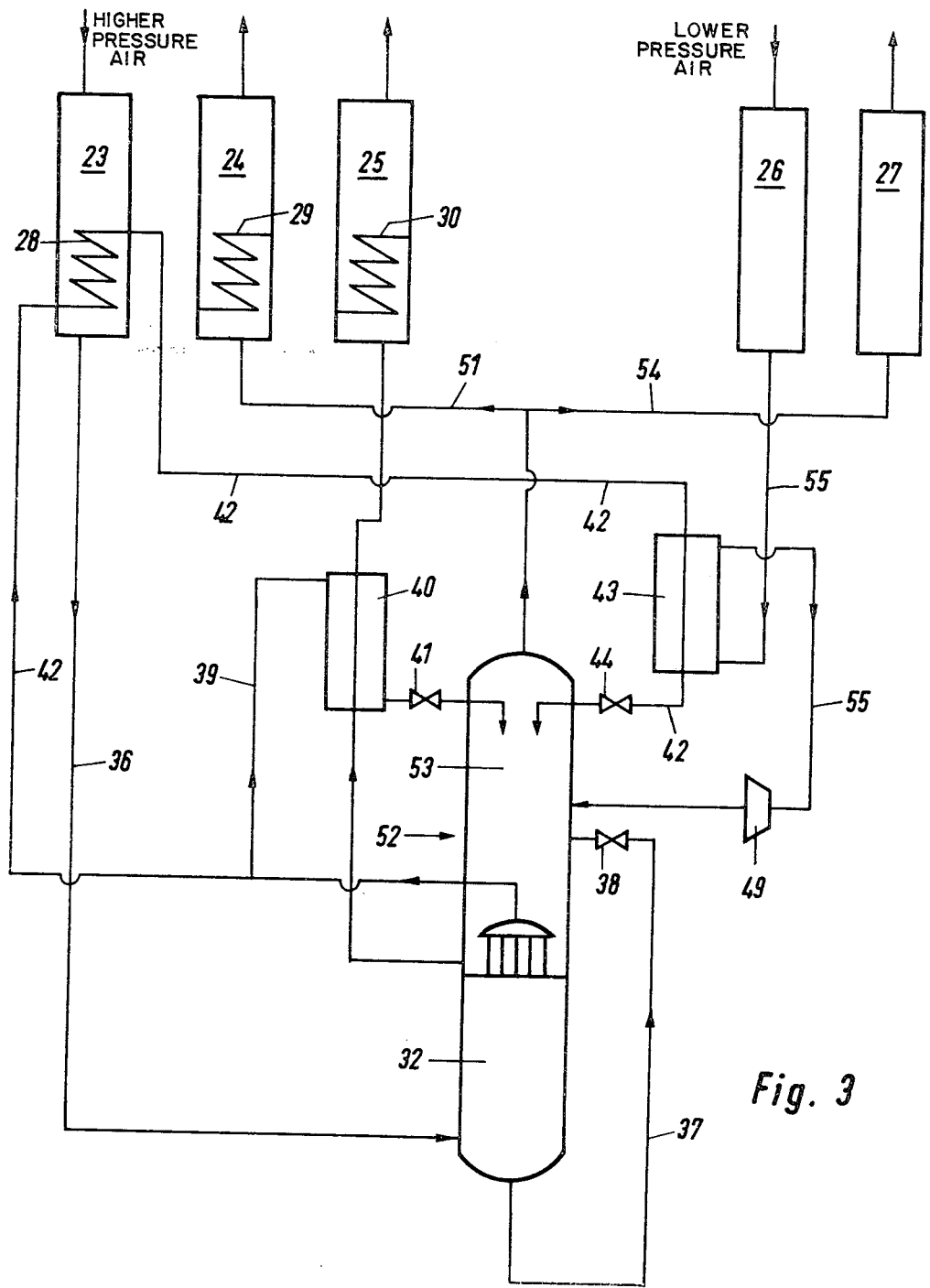
FIGURE 3 is a schematic view of a modified embodiment of the system of FIGURE 2, without the auxiliary rectification column.

The system illustrated in FIGURE 3 of the drawings is essentially the same system as that of FIGURE 2 but it differs in a few respects. Thus, a double rectification column 52 is employed wherein the high pressure section is the same as high pressure section 32 of FIGURE 2, but wherein low pressure section 53 is somewhat larger in its dimensions than the corresponding low pressure section 33 of FIGURE 2. In this way the auxiliary rectification column 35 of FIGURE 2 is omitted in the system shown in FIGURE 3.

An additional distinctive feature of the system of FIGURE 3 is that the top of the low pressure section 53 is in communication with the regenerator 27 via a conduit 54. Furthermore, conduit 42, instead of terminating at the auxiliary rectification column 35 as illustrated in FIGURE 2 of the drawings, ends in the top portion of the low pressure section 53. Finally, conduit 55 serially connects the regenerator 26, the countercurrent heat exchanger 43, the expansion engine 49, and the low pressure section 53 of the double rectification column 52 with one another. As a result, conduits 45, 46, and 48 as well as the throttle valve 47 of FIGURE 2 are not required in the system illustrated in FIGURE 3.

Still referring to FIGURE 3, the amount of air cooled in regenerator 26 flows via conduit 55 through the countercurrent heat exchanger 43 and through the expansion engine 49 to the low pressure section 53 of the double rectification column 52. In this process step, the air is again partially re-warmed in the countercurrent heat exchanger 43 and expanded to a pressure of about 1.2–1.7, preferably 1.2 atmospheres absolute in the expansion engine 49. The overhead product from high pressure section 32 is passed through conduit 42 and is likewise subjected to a pressure reduction in the throttle valve 44 to a pressure of about 1.2–1.7, preferably 1.2 atmospheres absolute.

Figure 4:
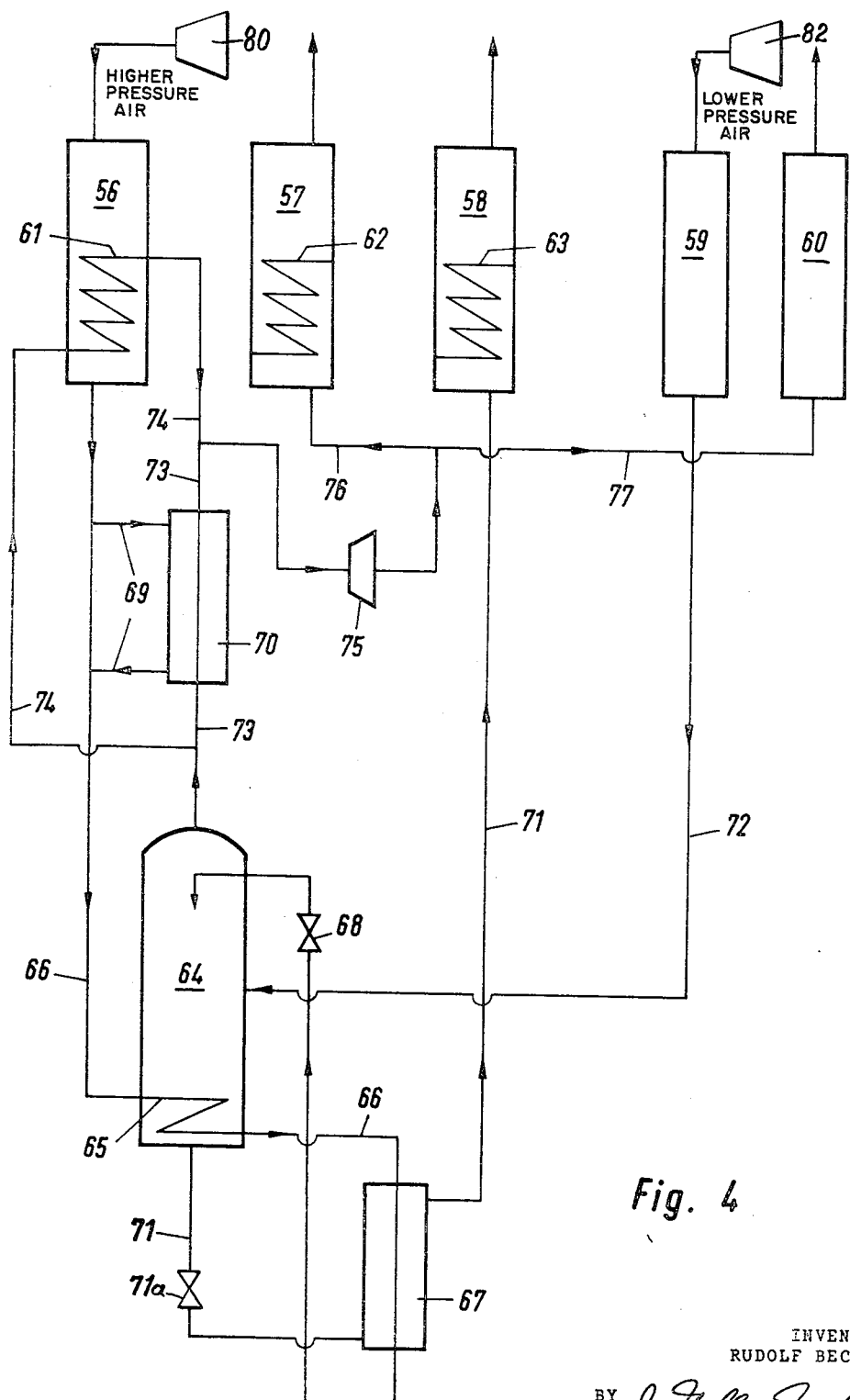
FIGURE 4 is a schematic view of a system incorporating a simple rectification column.

In the system illustrated by FIGURE 4 of the drawings, there can be processed for example, 128,000 Nm.³/h. of air to produce about 20,000 Nm.³/h. of oxygen having a purity of about 90%. For cooling the air from ambient temperature to about liquefaction temperature in countercurrent relation to the separation components, there are again provided a group of three regenerators 56, 57, and 58 which can be cyclically interchanged, as well as a group of two cyclically interchangeable regenerators 59 and 60. Heat exchange coils 61, 62, and 63 are inserted in the heat or cold storing packing of the regenerators 56, 57, and 58. As in the previously described embodiments, these coils permit a partial gas stream to be partially rewarmed without absorbing impurities deposited on the packing. The low temperature rectification of the air is conducted in a simple rectification column 64 having heat exchange coil 65 provided at the bottom thereof.

An amount of about 40 to 60%, for example 62,000 Nm.³/h. of the air to be separated is compressed in compressor 80 to a pressure of about preferably 4.4–5, for example 4.6 atmospheres absolute and cooled to close to liquefaction temperature in regenerator 56. This amount of air then flows through conduit 66 which serially connects regenerator 56, evaporator coil 65, countercurrent heat exchanger 67, throttle valve 68, and the top of the rectification column 64. The air is accordingly liquefied by indirect heat exchange with evaporating oxygen through passage coil 65 and then countercurrent heat exchanger 67. The resultant liquid is then pressure reduced in the throttle valve 68 to a pressure of about 1.7 atmospheres absolute, and fed to the rectification column 64 as reflux liquid. Before entering the evaporator coil 65, a portion (generally about 5 to 10%) of this amount of air is conducted, through branched conduits 69 to a countercurrent heat exchanger 70 and further cooled by indirect countercurrent heat exchange with cold nitrogen.

The final oxygen product is withdrawn as sump liquid from the bottom of the rectification column 64 through conduit 71. This latter conduit connects the rectification column 64 with the countercurrent heat exchanger 67 and further connects this latter heat exchanger 67 with the regenerator 58. The liquid oxygen is expanded to about 1.3 atmospheres absolute and then evaporated in the countercurrent heat exchanger 67 by heat exchanger with liquefying air and is then warmed to ambient temperature in the regenerator 58.

Another partial stream of the air to be separated, about 64,000 Nm.³/h. is compressed in compressor 82 to a pressure of about 1.7 to 2.1, preferably 1.9 atmosphere absolute, cooled, in the regenerator 59, to about liquefaction temperature, and fed to the rectification column 64 via conduit 72, at about the midpoint of this column. The rectification column 64 thus is under a pressure of about 1.9 atmospheres absolute at that point.

The nitrogen produced during the air separation process is withdrawn from the head of the rectification column 64 and is passed, via a branched-off conduit 73 and 74 through an expansion engine 75. The branched conduit 73 passes through the countercurrent heat exchanger 70, and the branched conduit 74 passes through the coil 61 of the regenerator 56. The gaseous nitrogen is partially warmed in the coil 61 and then in the countercurrent heat exchanger 70 before entering the expansion engine 75. After expansion in the expansion engine 75 to about ambient pressure, a portion about 35 to 40% of the nitrogen, is passed, via a conduit 76, to the regenerator 57, and another portion of the nitrogen is conducted, via a conduit 77, to the regenerator 60. In these regenerators 57 and 60, the nitrogen portions are heated to about ambient temperature and, simultaneously scavenge the impurities deposited on the packing therein.

A comparative economic evaluation of the described processes shows that the process according to FIGURE 4 is the most economical one, It needs 0.089 kwh. to produce 1 Nm.³ N₂, whereas the process according to FIGURE 1 needs 0.093 kwh. and that according to FIGURE 2 0.090 kwh.

In contrast to this, another process for the production of oxygen of 90% purity, which is not publicly known, needs 0.096 kwh. to produce 1 Nm.³ N₂, and the known Linde-Fränkl-process (oxygen of 99% purity needs 118 kwh. for 1 Nm.³ N₂.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

The embodiments of the invention in which an exclusive property or privilege is claimed are defined as follows:

1. In a low temperature process for the separation of gaseous mixtures which process comprises separating said gaseous mixture in a rectification column having a discharge point for the liquid product and engine expanding at least a portion of said gaseous mixture to provide makeup refrigeration, the improvement which comprises:
compressing said gaseous mixture to be separated in two partial streams, each partial stream being compressed to a different pressure,
compressing one partial stream to a high pressure not exceeding 6–10 atmospheres, cooling and feeding said high pressure stream directly to said rectification column as a single feed at the original composition of said one partial stream compressing the other partial stream to a lower pressure and feeding the lower pressure stream to said rectification column at a point about ½ way up the column from the discharge point of the liquid product.

2. A process as defined by claim 1, wherein said rectification column comprises a double column having a high pressure bottom section and a low pressure top section, said partial stream compressed to a lower pressure being introduced into the central portion of the low pressure top section.

3. A process as defined by claim 2 wherein said gaseous mixture to-be-separated is air, said liquid product is oxygen of moderate purity, and wherein there is introduced into the low pressure section of the double rectification column about 35% to 45% of the total amount of air that is to be separated.

4. A process for producing moderately pure oxygen from air as defined by claim 3 wherein the amount of air of the partial stream compressed to the lower pressure is about 19% to 21% of the entire amount of air to be separated.

5. A process as defined by claim 4 wherein the remaining quantity of the air to be introduced into the low pressure portion in order to provide the remaining portion of said about 35–45% less 19–21%, is a fraction of the partial stream compressed to a higher pressure, and wherein said fraction is engine-expanded before being injected into said low pressure section of the double rectification column.

6. A process as defined by claim 1 wherein pressure in the partial stream compressed to a lower pressure is about 1.2–1.7 atmosheres absolute, and the pressure in the partial stream compressed to a higher pressure is about 4.4–5.0 atmospheres absolute.

7. A process as defined by claim 4 wherein pressure in the partial stream compressed to a lower pressure is about 1.2–1.7 atmospheres absolute, and the pressure in the partial stream compressed to a higher pressure is about 4.4–5.0 atmospheres absolute.

8. A process as defined by claim 2, wherein the entire partial stream of the gas mixture compressed to a lower pressure is engine-expanded before it is injected into the low pressure section of the double rectification column.

9. A process as defined by claim 1, further comprising passing the partial stream of the gas mixture compressed to a lower pressure to an auxiliary column located externally of said rectification column prior to feeding thereof to said rectification column to obtain a liquid fraction of said partial stream enriched in a higher boiling separation component.

10. A process as defined by claim 9, further comprising throttling resultant enriched liquid fraction into the low pressure section of the double rectification column; and engine expanding overhead product from the auxiliary rectification column, and passing resultant engine expanded overhead product in indirect countercurrent heat transfer relationship with said partial stream of the gas mixture compressed to a lower pressure.

11. A process as defined by claim 3 characterized in that the amount of air of the partial stream compressed to the lower pressure is about 42–46% of the entire processed air quantity, and that the pressure in the partial stream compressed to the lower pressure is about 2.0–2.5 atmospheres absolute, and the pressure in the partial stream compressed to the higher pressure is about 4.4–5.0 atmospheres absolute.

12. A process as defined by claim 9 characterized in that the amount of air of the partial stream compressed to the lower pressure is about 42–46% of the entire processed air quantity, and that the pressure in the partial stream compressed to the lower pressure is about 2.0–2.5 atmospheres absolute, and the pressure in the partial stream compressed to the higher pressure is about 4.4–5.0 atmospheres absolute.

13. A process as defined by claim 2, wherein the high pressure section of the double rectification column operates under the pressure of the higher-compressed partial stream, and the low pressure section of the double rectification column operates under the pressure of the lower-compressed partial stream.

14. A process as defined by claim 1, wherein said gas mixture is air and said liquid product is oxygen of moderate purity, wherein the high pressure partial stream represents about 48–52% of the entire amount of air to be separated and is compressed to a pressure of about 4.4–5.0 atmospheres absolute; and the lower pressure partial stream is compressed to a pressure of about 1.7–2.1 atmospheres absolute; and further comprising at least partially liquefying said higher-compressed partial stream in indirect heat exchange with sump liquid in said rectification column, throttling resultant at least partially liquefied stream, passing resultant throttled stream to the head of the rectification column as reflux liquid; withdrawing a nitrogen stream as overhead from the rectification column, engine expanding withdrawn nitrogen stream, and passing resultant engine expanded stream in countercurrent heat transfer relationship with air to be separated.

15. A process as defined by claim 9 wherein said gas mixture is air, and said liquid product is oxygen of moderate purity.

16. A process as defined by claim 11 wherein said gas mixture is air, and said liquid product is oxygen of moderate purity.

17. An apparatus for the separation of gaseous mixtures, which apparatus comprises
(a′) means to divide said gaseous mixture into a first and second partial stream, means to compress said partial streams to different pressures;
(a) two groups of regenerators, the first group comprising three regenerators which can be cyclically interchanged and in the packing of which heat exchange coils are inserted, means communicating said first compressed partial stream to said first group of regenerators, and the second group comprising two regenerators which can likewise be cyclically interchanged, means communicating said second partial stream to said second group of regenerators;
(b) a one-stage rectification column, being provided with a heating coil at its bottom, first and second inlet conduits and two outlet conduits at its top and at its bottom, said first inlet conduit being in communication with said second group of regenerators;
(c) first and second indirect heat exchange means, each having cold and warm ends, the warm end of the first heat exchange means being in communication with said first group of regenerators, the cold end of the first heat exchange means being in communication with said top outlet conduit of the rectification column and with said heating coil at the bottom of the rectification column, the warm end of the second heat exchange means being in communication with the outlet end of said heating coil at the bottom of the rectification column and with said first group of regenerators, and the cold side of the second heat exchange means being in communication with the bottom outlet conduit of said rectification column and with said second inlet conduit of the rectification column.

18. In a process for the low temperature fractionation of air, which process comprises compressing air in two separate partial streams, each partial stream being compressed to a different pressure, cooling both partial streams, feeding the partial stream compressed to a lower pressure to a one-stage rectification column at a point about ½ way from the bottom to the top of the column, feeding the partial stream compressed to higher pressure to the rectification column and combining with the lower pressure stream and separating the combined streams into a liquid fraction consisting predominantly of oxygen and into a gaseous fraction consisting predominantly of nitrogen, the improvement which comprises:

(a) cooling the partial stream compressed to a higher pressure in indirect heat exchange with said liquid fraction;

(b) pressure reducing said heat exchanged liquid fraction;

(c) further cooling the entire partial stream compressed to a higher pressure in indirect heat exchange with the pressure reduced liquid fraction to thereby evaporate the liquid fraction and liquefy the entire partial stream compressed to a higher pressure;

(d) pressure reducing the liquefied partial stream; and (e) feeding the pressure reduced liquefied partial stream as a single feed at the original composition of said partial stream compressed to a higher pressure into the top of the one-stage rectification column.

19. A process as defined by claim 18, wherein the partial stream compressed to a higher pressure represents about 40 to 60% of the entire amount of air to be separated.

20. A process as defined by claim 18, wherein the partial stream compressed to a higher pressure represents about 48 to 52% of the entire amount of air to be separated.

References Cited

UNITED STATES PATENTS

| | | | |
|---|---|---|---|
| 2,423,274 | 7/1947 | Van Nurys | 62—29 XR |
| 2,664,719 | 1/1954 | Rice et al. | 62—29 XR |
| 2,699,047 | 1/1955 | Karwat et al. | 62—38 XR |
| 2,918,802 | 12/1959 | Grumberg | 62—38 XR |
| 2,964,914 | 12/1960 | Schuftan et al. | 62—14 |
| 3,066,494 | 12/1962 | Potts | 62—29 XR |
| 3,214,925 | 11/1965 | Becker | 62—38 XR |
| 3,257,814 | 6/1966 | Carbonell | 62—39 XR |
| 3,258,930 | 7/1966 | Jakob | 62—39 XR |
| 3,261,168 | 7/1966 | Rukemann et al. | 62—38 XR |

FOREIGN PATENTS 894,248    7/1949    Germany.

WILBUR L. BASCOMB, Jr., Primary Examiner

U.S. Cl. X.R.
62—30, 38, 39

UNITED STATES PATENT OFFICE
CERTIFICATE OF CORRECTION

Patent No. 3,490,246　　　　　　　　　　Dated　January 20, 1970

Inventor(s)　Rudolf Becker

It is certified that error appears in the above-identified patent and that said Letters Patent are hereby corrected as shown below:

Column 6, Line 73, change "118" to ---0.118---

SIGNED AND
SEALED
OCT 13 1970

(SEAL)
Attest:

Edward M. Fletcher, Jr.
Attesting Officer

WILLIAM E. SCHUYLER, JR.
Commissioner of Patents

FORM PO-1050 (10-69)